United States Patent
Wada et al.

(10) Patent No.: US 8,354,187 B2
(45) Date of Patent: Jan. 15, 2013

(54) SECONDARY BATTERY AND METHOD FOR PRODUCING THE SAME

(75) Inventors: Naoyuki Wada, Osaka (JP); Kiyomi Kozuki, Osaka (JP); Hideaki Fujita, Osaka (JP); Yukihiro Okada, Osaka (JP)

(73) Assignee: Panasonic Corporation, Osaka (JP)

( * ) Notice: Subject to any disclaimer, the term of this patent is extended or adjusted under 35 U.S.C. 154(b) by 764 days.

(21) Appl. No.: 12/520,679

(22) PCT Filed: Oct. 17, 2008

(86) PCT No.: PCT/JP2008/002949
§ 371 (c)(1),
(2), (4) Date: Jun. 22, 2009

(87) PCT Pub. No.: WO2009/060564
PCT Pub. Date: May 14, 2009

(65) Prior Publication Data
US 2009/0305123 A1      Dec. 10, 2009

(30) Foreign Application Priority Data
Nov. 5, 2007   (JP) ................................. 2007-286970

(51) Int. Cl.
*H01M 2/26* (2006.01)
*H01M 4/00* (2006.01)
(52) U.S. Cl. ......................................... 429/161; 429/94
(58) Field of Classification Search .................... 429/94, 429/161
See application file for complete search history.

(56) References Cited

U.S. PATENT DOCUMENTS

| 7,273,678 B2 | 9/2007 | Akita et al. |
| 2002/0004162 A1* | 1/2002 | Satoh et al. ..................... 429/94 |
| 2002/0068217 A1 | 6/2002 | Watanabe et al. |
| 2004/0061476 A1* | 4/2004 | Nakamaru et al. ............. 320/107 |
| 2004/0128826 A1* | 7/2004 | Nakanishi et al. ........... 29/623.4 |
| 2007/0190404 A1 | 8/2007 | Hatanaka et al. |
| 2007/0196730 A1 | 8/2007 | Kozuki |
| 2008/0166630 A1 | 7/2008 | Okabe et al. |

FOREIGN PATENT DOCUMENTS

| CN | 1533615 A | 9/2004 |
| JP | 10-064511 | 3/1998 |
| JP | 2002-015722 | 1/2002 |
| JP | 2002-151047 | 5/2002 |
| JP | 2004-247192 | 9/2004 |
| JP | 2006-156135 | 6/2006 |

* cited by examiner

*Primary Examiner* — Patrick Ryan
*Assistant Examiner* — Muhammad Siddiquee
(74) *Attorney, Agent, or Firm* — McDermott Will & Emery LLP (57) ABSTRACT

A secondary battery includes an electrode group 4 in which a positive electrode plate 1 and a negative electrode plate 2 are wounded with a porous insulation layer interposed therebetween, wherein an electrode plate end portion 1a protrudes from the porous insulation layer and abuts the current collector plate 5, and the current collector plate 5 is placed in relation to the electrode group 4 so as to entirely cover the end portion 1a of the electrode group 4. Parts of the electrode plate end portion 1a abutting the current collector plate 5 are welded to the current collector plate 5 at discrete joint portions 6 on the current collector plate 5, and the joint portions 6 are discretely provided on a surface of the current collector plate 5 so that a current flowing from the electrode plate 1 to the current collector plate 5 is uniformly distributed.

2 Claims, 5 Drawing Sheets

SECONDARY BATTERY AND METHOD FOR PRODUCING THE SAME

RELATED APPLICATIONS

This application is the U.S. National Phase under 35 U.S.C. §371 of International Application No. PCT/JP2008/002949, filed on Oct. 17, 2008, which in turn claims the benefit of Japanese Application No. 2007-286970, filed on Nov. 5, 2007, the disclosures of which Applications are incorporated by reference herein.

TECHNICAL FIELD

The present disclosure relates to a secondary battery including an electrode group having a tab-less configuration, and more particularly relates to a high output secondary battery having excellent life property and a method for producing the secondary battery.

BACKGROUND ART

In recent years, electrochemical devices used as driving power sources have been further developed for use as a type of important key devices. Among such electrochemical devices, especially, nickel hydride storage batteries and lithium ion secondary batteries have been widely used as driving power sources for a wide range of devices including cellular phones, consumer devices, electric cars and electric tools, because they are light in weight and compact in size and also have high energy density. Recently, particular attention has been drawn to lithium ion secondary batteries as driving power sources, and the development of lithium ion secondary batteries has been actively conducted for the purpose of increasing capacity and output thereof.

A secondary battery used as a driving power source is required to provide a large output current. Therefore, secondary batteries having an improved battery configuration, specifically, an improved current collector configuration have been proposed.

For example, a current collector configuration in which, in order to increase an electrode area, a positive electrode plate and a negative electrode plate are wound with a separator interposed therebetween and each of the positive electrode plate and the negative electrode plate is jointed to a corresponding current collector plate via a current collector tab by welding or like technique has been employed. However, in such a current collector configuration, since an electric resistance of the current collector tab is large and only low current collector efficiency is achieved, it has been difficult to use this current collector configuration as a driving power source which is required to provide a large output current.

In a tab-less current collector configuration in which each of a positive electrode plate and a negative electrode plate is, in its entire area, jointed to a corresponding current collector plate, an electric resistance can be reduced, and therefore, the tab-less current collector is suitable for large current discharge. However, to achieve tab-less current collection, respective end portions of the positive electrode plate and the negative electrode plate have to be jointed to current collector plates, respectively, by welding or the like.

Figure 7:
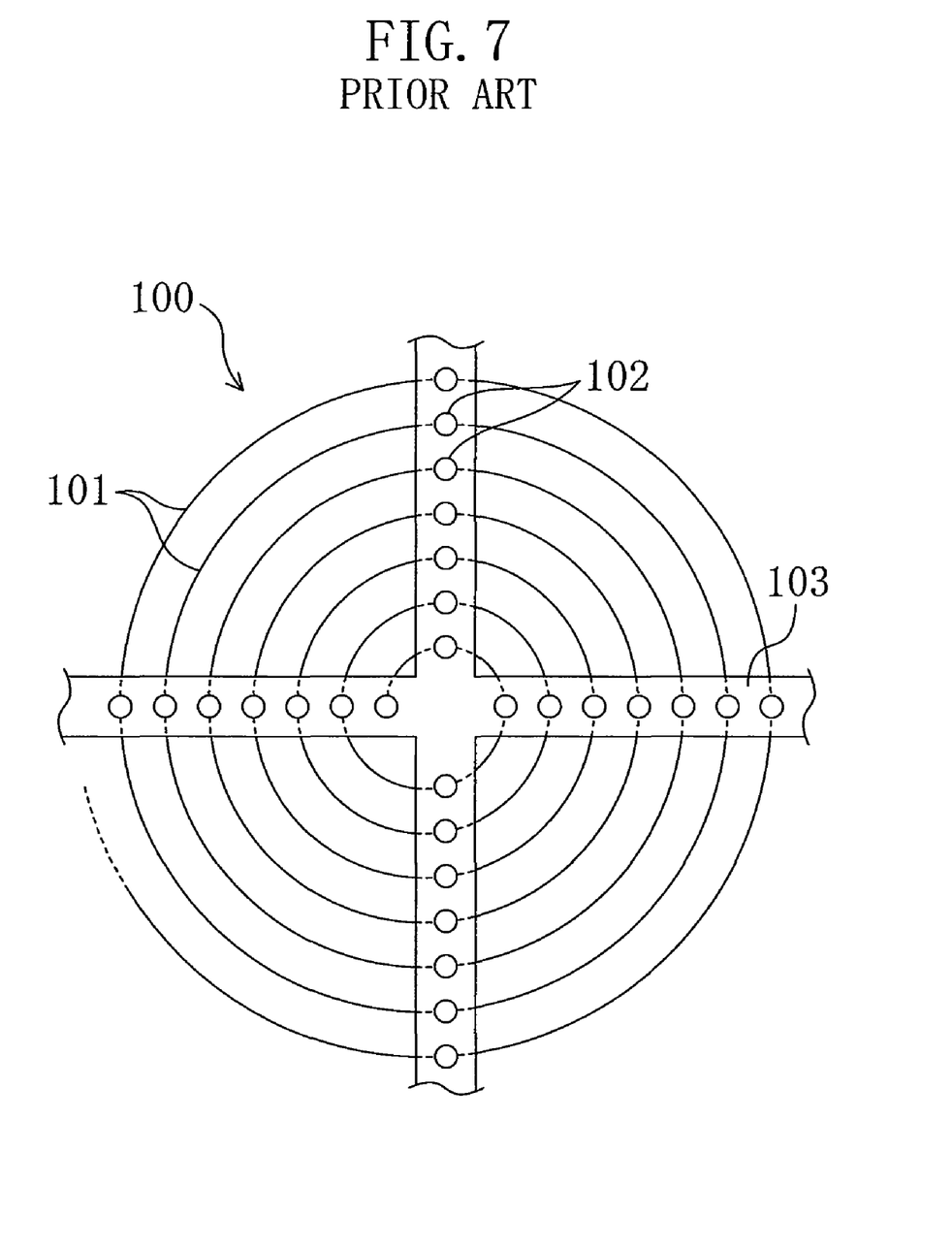
FIG. 7 is a plan view illustrating a known tab-less current collector configuration.

FIG. 7 is a plan view illustrating a tab-less current collector configuration described in Patent Document 1. As shown in FIG. 7, an electrode plate end portion 101 of an electrode group 100 wound with a separator (not shown) interposed between electrodes is welded to a current collector plate 103 having a cross-shape (a Y-shape, an I-shape or the like) at joint spots 102.

In the current collector configuration formed in the above-described manner, the electrode plate end portion 101 can be reliably welded to the current collector plate 103 at the joint spots 102. Moreover, because the current collector plate 103 has a cross-shape, joint positions can be easily checked and also a joint state can be easily examined, so that a highly reliable current collector configuration can be achieved. Furthermore, the current collector plate 103 does not have any other extra portion but the joint spots 102, and thus weight reduction of a battery can be realized. Furthermore, almost entire part of the electrode plate end portion 101 of the electrode group 100 is not covered by the current collector plate 103 and exposed, and thus the electrode group 100 can be quickly filled up with an electrolyte when injecting the electrolyte thereinto.

Patent Document 1: Japanese Published Patent Application No. 2004-247192

DISCLOSURE OF THE INVENTION

Problems which the Invention is to Solve

The method described in Patent Document 1 is effective in the point that the method allows reliable and simple welding of the electrode plate end portion of the electrode group to the current collector plate and thus improvement of reliability of a battery and weight reduction of the battery can be achieved. However, the present inventors found, as a result of various examinations which they conducted, that the following problems existed.

Welding of the electrode end portion to the current collector plate is performed by irradiating energy such as laser or the like to joint spots of the current collector plate to fuse parts of the current collector plate located at the joint spots. At a time of energy irradiation, part of a fused material might be scattered and reattached to exposed part of the electrode group which is not covered by the current collector plate. In such a case, an internal short-circuit might occur in the electrode group and cause reduction in reliability of the battery.

Moreover, since the current collector plate has a cross-shape, welding of the entire part of the electrode plate end portion of each electrode plate to the current collector plate can not be achieved and locations of joint spots are limited only to part of each electrode plate which has a cross-shape and in which the current collector plate is placed. If the number of the joint spots 102 is small, there arises a problem in which an internal resistance is increased (in Patent Document 1, in order to suppress increase in internal resistance, the number of winding units each of which includes one or more joint portions is set at 70% or more of the total number of windings). In addition, there is another problem in which a pitch of the joint spots located along a winding direction of the electrode group on the outer side is larger than the pitch of the joint spots on the inner side, and this nonuniform joint pitch causes variations of a current distribution in the electrode plate. As a result, an electrode active material might be locally deteriorated furthermore, thus resulting in reduction in battery life.

In view of the above-described problems, the present invention has been devised and it is therefore a major object of the present invention to provide a secondary battery having a tab-less current collector configuration with excellent reliability and life property, and a method for producing the secondary battery.

Solution to the Problems

In a current collector configuration for a secondary battery according to the disclosure of the present invention, a current collector plate is placed so as to entirely cover each electrode plate end portion of an electrode group and joint portions of the electrode plate end portion are discretely provided on a surface of the current collector plate so that a current flowing from an electrode plate to the current collector plate is uniformly distributed.

Specifically, a secondary battery according to the disclosure of the present invention is a secondary battery including an electrode group in which a positive electrode plate and a negative electrode plate are wounded with a porous insulation layer interposed therebetween, and is characterized in that an end portion of at least one of the electrode plates having one polarity protrudes from the porous insulation layer and abuts a current corrector plate and the current collector plate is placed in relation to the electrode group so as to entirely cover the end portion of the electrode plate of the electrode group, parts of the end portion of the electrode plate abutting the current collector plate are welded to the current collector plate at discrete joint portions on a surface of the current collector plate, and the joint portions are discretely provided on the surface of the current collector plate so that a current flowing from the electrode plate to the current collector plate is uniformly distributed.

With the above-described configuration, because the end portion in the electrode group is entirely covered by the current collector plate, even when part of a fused material is scattered at a time of welding, reattachment of the fused material to the electrode plate can be prevented. Thus, the generation of an internal short-circuit due to reattachment of the fused material to the electrode group can be prevented. Moreover, by providing the joint portions so that a current flowing from the electrode plate to the current collector plate is uniformly distributed, local deterioration of an electrolytic active material due to variations of a current distribution can be suppressed. In addition, since the joint portions are discretely provided on the surface of the current collector plate, increase in temperature of the current collector plate caused by energy irradiation at a time of welding can be effectively suppressed. As a result, a secondary battery having a current collector configuration with excellent reliability and life property can be achieved.

In this case, each of the joint portions preferably has a width large enough to include the parts of the end portion of the electrode plate which abut the current collector plate and correspond to at least two or more windings.

With this configuration, even though the current collector plate is fused at the joint portions, the fused material does not fall from the current collector plate and is held in spaces between the parts of the electrode plate due to surface tension, because the parts of the end portion corresponding to at least two windings abuts each of the joint portions. As a result, the end portion of the electrode plate can be reliably welded to the current collector plate at the joint portions.

The end portion of the electrode plate is preferably welded to the current collector plate with a uniform pitch along a winding direction of the electrode group. Thus, a uniform distribution of a current flowing from the electrode plate to the current collector plate can be achieved.

Each of the joint portions is preferably provided according to a location expressed by polar coordinates $(r, \theta)$ (i.e., a point at a distance of r from a winding center of the electrode group regarded as an original point in a direction making an angle $\theta$ with a radial direction of the current collector plate regarded as an initial line) set on the surface of the current collector plate.

With this configuration, even when the electrode group covered by the current collector plate can not be visually confirmed, locations of the joint portions can be controlled in a simple manner based on virtual coordinate axes defined on the current collector plate, and thus welding can be performed precisely and efficiently.

The polar coordinates $(r, \theta)$ is preferably expressed by the following equation:

$$(r,\theta) = (ns, 2m\pi/n)$$

(where s is the width of the joint portions, n is 1 or a larger natural number, and m is a natural number satisfying $1 \leq m \leq n$).

With this configuration, the joint portions can be provided with a uniform pitch along the winding direction of the electrode group.

A method for producing a secondary battery according to the disclosure of the present invention is a method for producing a secondary battery including an electrode group in which a positive electrode plate and a negative electrode plate are wounded with a porous insulation layer interposed therebetween, and is characterized in that the method includes the steps of: a) preparing an electrode group in which the positive electrode plate and the negative electrode plate are wounded with the porous insulation layer interposed therebetween so that an end portion of at least one of the electrode plates having one polarity protrudes from the porous insulation layer; b) placing a current collector plate in relation to the electrode group so that the current collector plate entirely covers the end portion of the electrode plate of the electrode group and thereby making the end portion of the electrode plate abut the current collector plate; and c) welding parts of the end portion of the electrode plate abutting the current collector plate to the current collector plate at discrete joint portions on a surface of the current collector plate, and in the step c), each of the joint portions provided according to a location expressed by polar coordinates $(r, \theta)$ (i.e., a point at a distance of r from a winding center of the electrode group regarded as an original point in a direction making an angle $\theta$ with a radial direction of the current collector plate regarded as an initial line) set on the surface of the current collector plate.

Effects of the Invention

According to the disclosure of the present invention, a secondary battery having a tab-less current collector configuration having excellent reliability and life property can be achieved.

BRIEF DESCRIPTION OF THE DRAWINGS

FIGS. 1(a), 1(b) and 1(c) are views schematically illustrating a configuration of an electrode group according to an embodiment of the present invention.

FIGS. 2(a) and 2(b) are views schematically illustrating a current collector configuration according to the embodiment of the present invention: FIG. 1(b) is a cross-sectional view of the positive electrode current collector plate.

FIGS. 3(a) and 3(b) are partial cross-sectional views of a current collector configuration of the embodiment.

EXPLANATION OF REFERENCE NUMERALS

| | |
|---|---|
| 1 | Positive electrode group |
| 1a | Positive electrode plate end portion (positive electrode mixture-uncoated portion) |
| 2 | Negative electrode plate |
| 2a | Negative electrode plate end portion (negative electrode mixture-uncoated portion) |
| 2b | Negative electrode mixture coated portion |
| 4 | Electrode group |
| 5 | Positive electrode current collector plate |
| 6, 6a and 6b | Joint portions |
| 7 | Negative electrode current collector plate |
| 8 | Battery case |
| 9 | Positive electrode lead |
| 10 | Sealing plate |
| 11 | Gasket |

BEST MODE FOR CARRYING OUT THE INVENTION

Hereinafter, embodiments of the present invention will be described with reference to the accompanied drawings. In the drawings, each component having substantially the same function is identified by the same reference numeral for simplicity of explanation. Note that the present invention is not limited to the following embodiment.

Figure 1A:
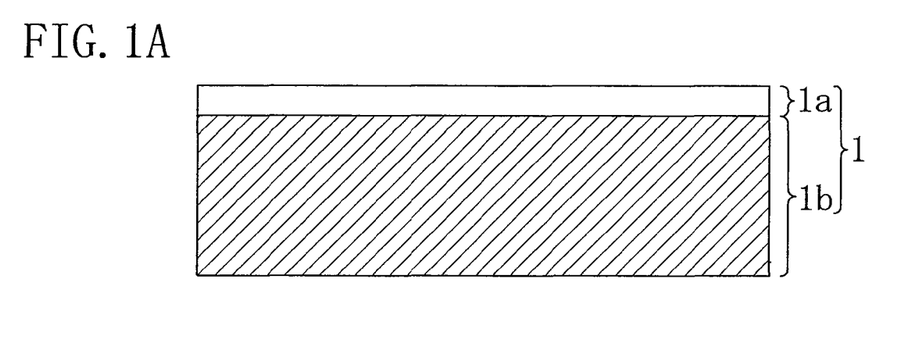
FIG. 1(a) is a plan view of a positive electrode plate.
Figure 1B:
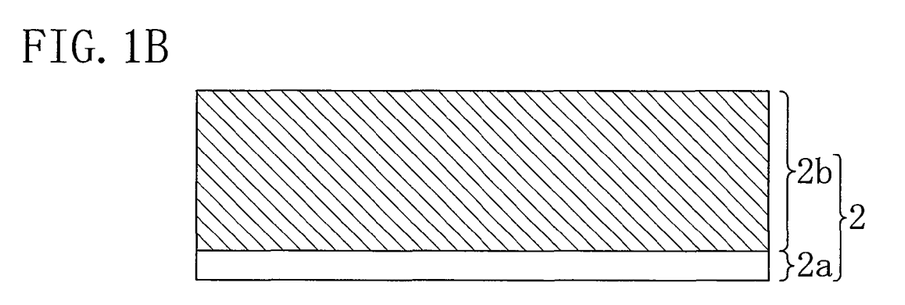
FIG. 1(b) is a plan view of a negative electrode plate.
Figure 1C:
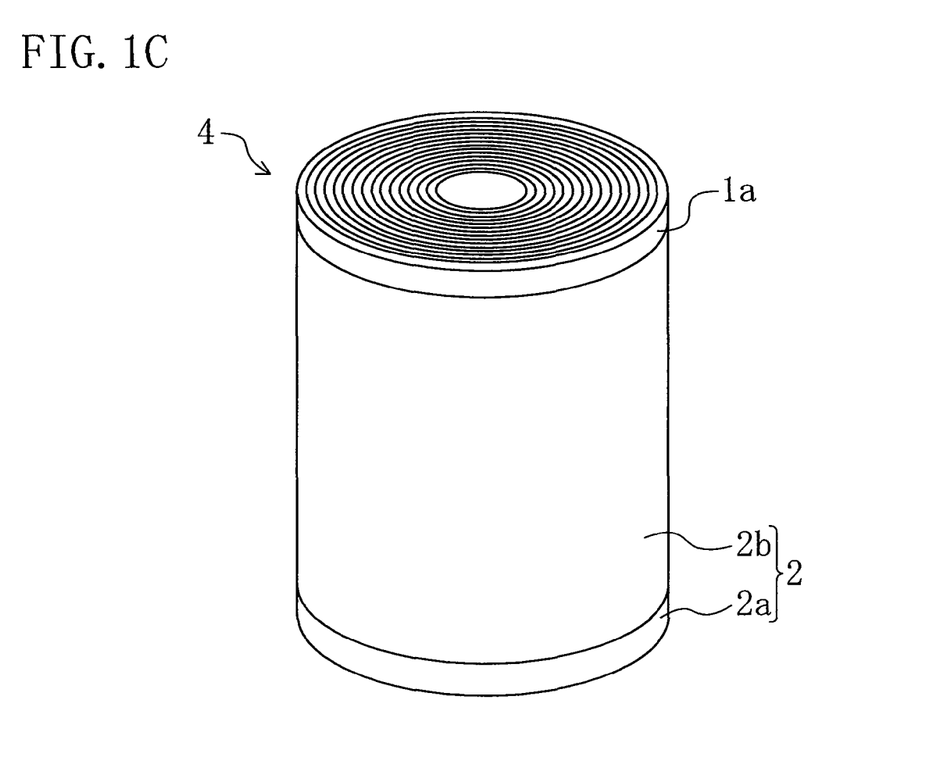
FIG. 1(c) is a perspective view of the electrode group.

FIGS. 1(a) through 1(c) are views schematically illustrating a configuration of an electrode group 4 according to this embodiment. FIG. 1(a) is a plan view of a positive electrode plate 1. FIG. 1(b) is a plan view of a negative electrode plate 2. FIG. 1(c) is a perspective view of the electrode group 4.

As shown in FIG. 1(a), the positive electrode plate 1 includes a coated portion 1b in which a positive electrode mixture containing an active material is applied so as to have a belt-like shape and an uncoated portion (an exposed end portion of the positive electrode current collector) 1a, the coated portion 1b and the uncoated portion 1a being arranged side by side in a width direction of a positive electrode current collector. As shown in FIG. 1(b), the negative electrode plate 2 includes a coated portion 2b in which a negative electrode mixture containing an active material is applied so as to have a belt-like shape and an uncoated portion (an exposed end portion of the negative electrode current collector) 2a, the coated portion 2b and the uncoated portion 2a being arranged side by side in a width direction of a negative electrode current collector. Furthermore, as shown in FIG. 1(c), the electrode group 4 has a configuration in which the positive electrode plate 1 and the negative electrode plate 2 are wound with a porous insulation layer interposed therebetween so that the respective end portions of the positive electrode plate 1 and the negative electrode plate 2 protrude from the porous insulation layer (not shown).

In this case, the porous insulation layer may be a microporous film made of resin, a porous insulation layer made of a filler such as metal oxide, or a stacked layer body including a microporous film and a porous insulation film.

Figure 2A:
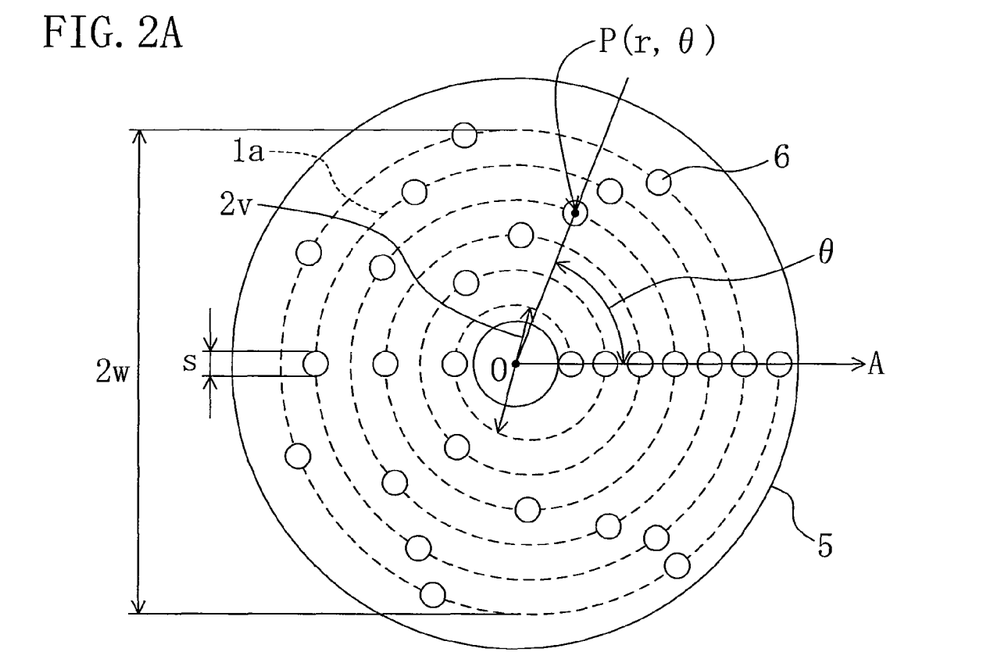
FIG. 2(a) is a plan view of the current collector configuration illustrating a state in which an end portion of a positive electrode plate is jointed to a positive electrode current collector plate.
Figure 2B:
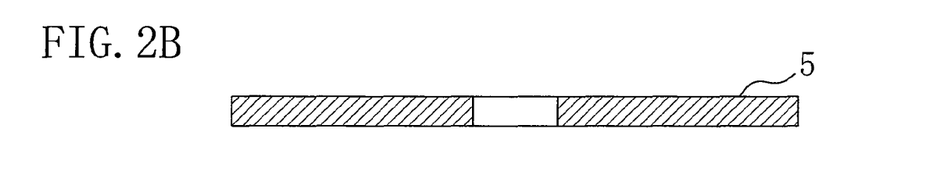

FIGS. 2(a) and 2(b) are views schematically illustrating a current collector configuration according to this embodiment. FIG. 2(a) is a plan view illustrating a state in which the end portion 1a of a positive electrode plate is jointed to a positive electrode current collector plate 5. FIG. 2(b) is a cross-sectional view of the positive electrode current collector plate 5. Note that the present invention is applicable regardless whether an electrode, an electrode current collector or the like has positive or negative polarity and, therefore, names of components such as an "electrode plate," a "current collector plate" and the like will be merely given without mentioning their polarity in the following description. In the drawings, reference numerals are given only for positive electrode components. It is, of course, assumed that the present invention includes the case where the inventive configuration is applied to only electrode components of one polarity.

As shown in FIG. 2(a), the end portion 1a of the electrode plate is provided so as to protrude from the porous insulation layer (not shown) and abut the current collector plate 5, and the current collector plate 5 is placed in relation to the electrode group so as to entirely cover the end portion 1a of the electrode plate in the electrode group. Parts of the end portion 1a of the electrode plate which abut the current collector plate 5 are welded to the current collector plate 5 at discrete joint portions 6 on a surface of the current collector plate 5. In this case, the joint portions 6 are discretely provided on the surface of the current collector plate 5 so that a current flowing from the electrode plate to the current collector plate 5 is uniformly distributed.

In the above-described manner, with the configuration in which the end portion 1a in the electrode group is entirely covered by the current collector plate 5, even when fused part of the current collector plate 5 is scattered at a time of welding, reattachment of the fused material to the electrode plate can be prevented. Thus, the generation of an internal short-circuit due to reattachment of the fused material to the electrode group can be effectively prevented.

Moreover, by providing the joint portions 6 so that a current flowing from the electrode plate to the current collector plate 5 is uniformly distributed, local deterioration of an electrolytic active material due to variations of a current distribution can be suppressed. In addition, since the joint portions 6 are discretely provided on the surface of the current collector plate 5, the effect of suppressing increase in temperature of the current collector plate 5 caused by energy irradiation at a time of welding can be also achieved.

With the above-described current collector configuration, a secondary battery with excellent reliability and life property can be achieved.

Figure 3A:
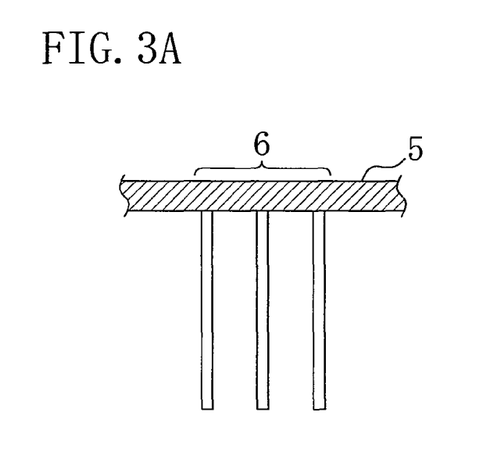
FIG. 3(a) is a view illustrating a state before welding.
Figure 3B:
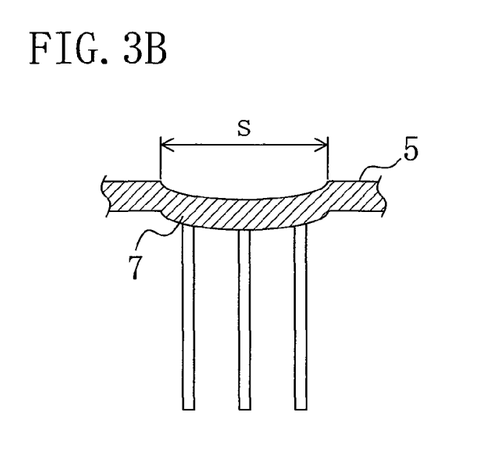
FIG. 3(b) is a view illustrating a state after welding.

In this case, as shown in FIG. 3(a), each of the joint portions 6 preferably has a width large enough to include the parts of the end portion 1a which abut the current collector plate 5 and correspond to at least two or more windings (three windings in FIG. 3(a)). Thus, as shown in FIG. 3(b), even though the current collector plate 5 is fused when laser or the like is irradiated to the joint portions 6 to weld the end portion 1a to the current collector plate 5, the fused material does not fall from the current collector plate 5 and is held in spaces between the parts of the end portion 1a due to surface tension, because the parts of the end portion 1a corresponding to at least two or more windings abuts each of the joint portions 6. As a result, the end portion 1a can be reliably welded to the current collector plate 5 at the joint portions 6.

According to the disclosure of the present invention, to obtain a uniform distribution of a current flowing from the electrode plate to the current collector plate 5, the end portion 1a is preferably welded to the current collector plate 5 with a uniform pitch along a winding direction of the electrode group 4. Herein, "a uniform pitch" does not necessarily means the same pitch, but also includes discrete pitches allowing a distribution of a current flowing from the electrode plate to the current collector plate 5 with which local deterioration of an electrolytic active material can be prevented.

Next, a specific method for providing the joint portions 6 on the surface of the current collector plate 5 with a uniform pitch will be described with reference to FIG. 2(a). Note that the method described below is one example and there is no intention to limit the present invention to the following method.

As shown in FIG. 2(a), each of the joint portions 6 is provided on one surface of the current collector plate 5 so as to be located at a location P expressed in polar coordinates (r, θ) defined by the following equation.

$$(r,\theta)=(ns, 2m\pi/n)$$

(where s is the width of the joint portions, n is 1 or a larger natural number, and m is a natural number satisfying $1 \leq m \leq n$)

In this case, assuming that a winding center O of the electrode group is an original point and a radial direction of the current collector plate 5 is an initial line OA, the polar coordinates (r, θ) expresses a point located at a distance of r from the original point in a direction making an angle θ with the initial line OA.

Thus, with the joint portions provided based on virtual coordinate axes defined on the current collector plate 5, even when the electrode group covered by the current collector plate 5 can not be visually confirmed, locations of the joint portions 6 can be controlled in a simple manner, and thus welding can be performed precisely and efficiently. Also, by setting a location of each of the joint portions 6 to be a point expressed by the above-described equation for the polar coordinates (r, θ), the joint portions 6 can be provided with a uniform pitch along the winding direction of the electrode group.

Then, if it is assumed that, as shown in FIG. 2(a), the inside diameter of the electrode group is v and the outside diameter of the electrode group is w, each of the joint portions 6 to be provided on the surface of the current collector plate 5 can be expressed by the following equation.

$$(r,\theta)=(ns, 2m\pi/n)$$

(where s is the width of the joint portions, n is 1 or a larger natural number satisfying v<ns<w, and m is a natural number satisfying $1 \leq m \leq n$)

Note that as shown in FIGS. 3(a) and 3(b), when multiple parts of the end portion 1a are jointed to each of the joint portions 6, the joint pitch at an outer side is larger than the joint pitch at an inner side. However, the joint pitch is sufficiently large, compared to a distance between windings of the electrode plate and, therefore, a difference in joint pitch is negligibly small.

Figure 4:
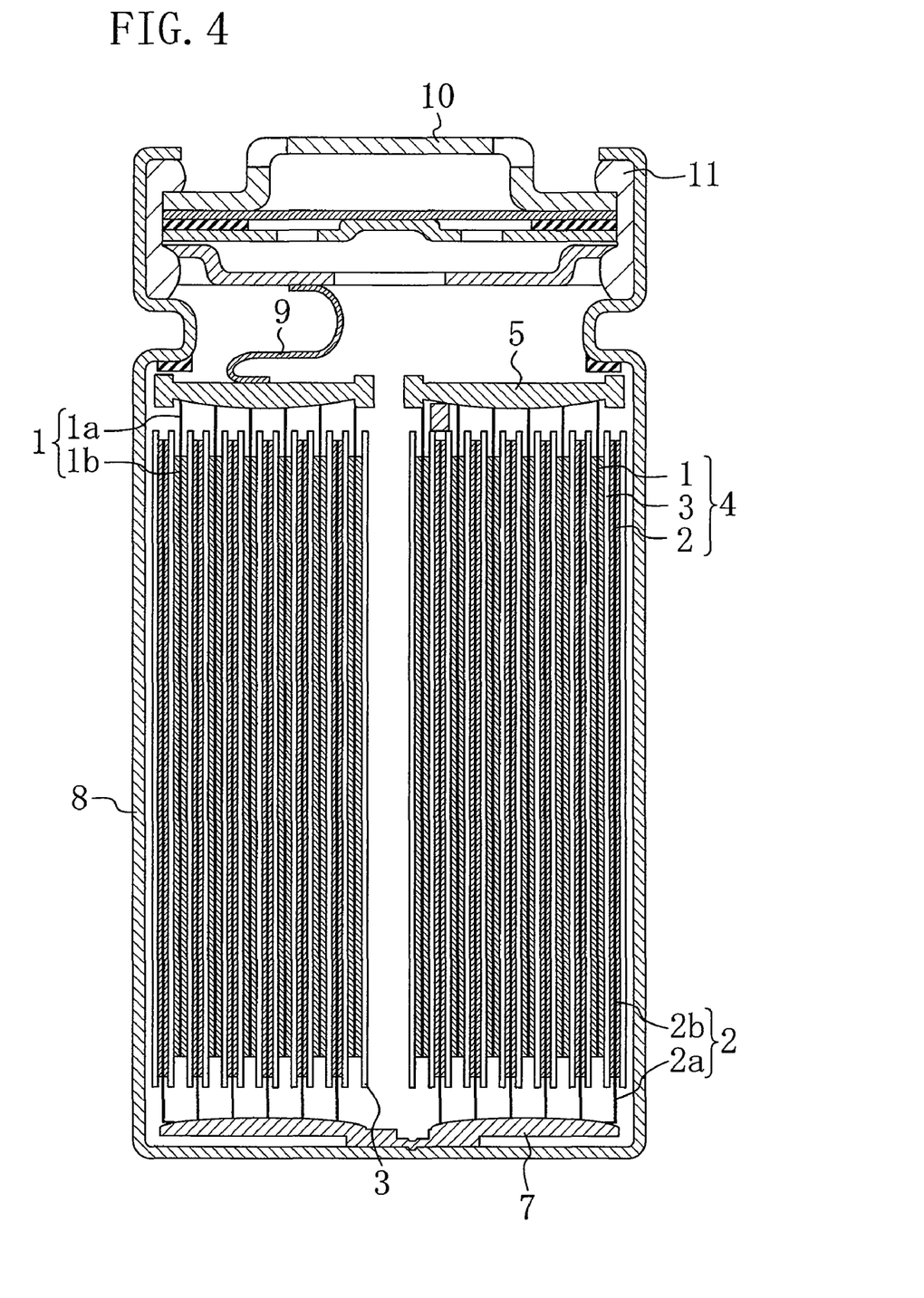
FIG. 4 is a cross-sectional view schematically illustrating a configuration of a secondary battery according to the embodiment.

FIG. 4 is a cross-sectional view schematically illustrating a configuration of a secondary battery obtained by providing the current collector configuration formed according to the above-described method in a battery case 8. A negative electrode current collector plate 7 is connected to a bottom portion of the battery case 8 and the positive electrode current collector plate 5 is connected to a sealing plate 10 via a positive electrode lead 9. A nonaqueous electrolyte is injected into the battery case 8, and the battery case 8 is closely sealed by the sealing plate 10 with a gasket 11 interposed between the sealing plate 10 and the battery case 8.

In the current collector configuration according to the disclosure of the present invention, the wound electrode group is covered by the positive electrode current collector plate 5. In a center portion of the positive electrode current collector plate 5, a through hole is formed beforehand, so that an electrolyte can be quickly filled in the electrode group through the through hole when the electrolyte is injected. Normally, the electrode group is formed by winding electrode plates around a winding core and then taking out the winding core from the electrode group, so that a space is provided in the center of the electrode group. Therefore, as long as the size of the through hole formed in the center portion of the positive electrode current collector plate 5 is smaller than a diameter of the space in the electrode group, the entire part of the electrode group stays covered by the current collector plate 5 without being exposed.

Note that welding of the electrode plate end portions 2a of the negative electrode plate 2 to the negative electrode current collector plate 7 can be performed in the same manner as welding of the electrode plate end portions 1a of the positive electrode plate 1 to the positive electrode current collector plate 5.

As shown in FIG. 2(a), for the electrode group having cylindrical shape, a uniform joint pitch can be achieved by setting the location of each of the joint portions 6 on the surface of the current collector plate 5 using predetermined polar coordinates. However, this method is not suitable for an electrode group having a flat shape.

Figure 5:
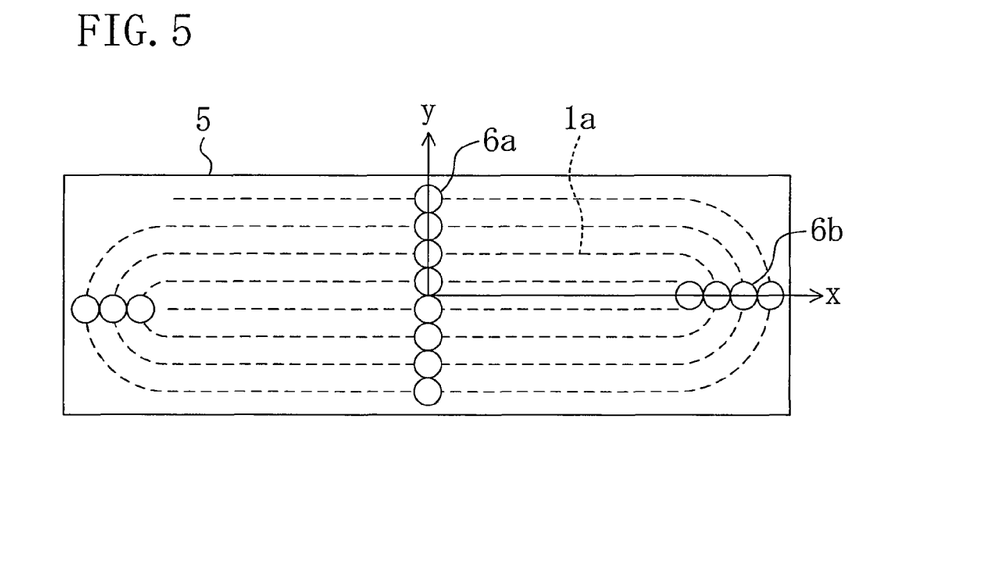
FIG. 5 is a plan view schematically illustrating a current collector configuration of an electrode group having a flat, wound configuration according to the embodiment.

FIG. 5 is a plan view schematically illustrating a current collector configuration of an electrode group having a flat, wound configuration, and illustrates a state where the electrode plate end portion 1a is jointed to the current collector plate 5.

As shown in FIG. 5, the current collector plate 5 is placed in relation to the electrode group so as to entirely cover the electrode end portion 1a of the electrode group. On the current collector plate 5, joint portions 6a are continuously arranged from a center of the electrode group at certain intervals in a short axis direction of the electrode group (i.e., in the y-axis direction in FIG. 5), and joint portions 6b are continuously arranged in folded parts of the electrode group having an arc shape at certain intervals in a long axis of the electrode group direction (i.e., in the x-axis direction in FIG. 5).

With the above-described configuration, the joint portions 6a and 6b can be provided with a uniform pitch along the winding direction of the electrode group. Also, even when the electrode group covered by the current collector plate 5 can not be visually confirmed, locations of the joint portions 6a and 6b can be controlled in a simple manner based on virtual coordinate axes (the short axis and the long axis) defined on the current collector plate 5, and thus welding can be performed precisely and efficiently.

Note that at the folded parts of the electrode group, the joint pitch at an outer side is larger than the joint pitch at an inner side. However, the long axis of the electrode group is sufficiently long, compared to the short axis of the electrode group and, therefore, such a difference in joint pitch is negligibly small.

In this case, as shown in FIG. 5, the current collector plate 5 has a rectangular shape. However, as long as the current collector plate 5 covers the electrode group, the current collector plate 5 may have any shape and, for example, may have a similar shape to a flat electrode group.

EXAMPLES

Hereinafter, examples of application of the present invention to a lithium ion secondary battery will be described.

1. Method for Producing Lithium Ion Secondary Battery

Example 1

(1) Formation of Positive Electrode Plate

First, 85 by weight of lithium cobaltate powder as a positive electrode active material, 10 parts by weight of carbon powder as a conductive agent, and 5 parts by weight of polyvinylidene fluoride (PVDF) as a binder were prepared. Then, the prepared positive electrode active material, conductive agent, and binder were mixed to form a positive electrode mixture.

Next, the positive electrode mixture was applied to both surfaces of a positive electrode current collector made of aluminum foil and having a thickness of 15 μm and a width of 56 mm, and dried. Thereafter, a portion (positive electrode mixture coated portion) of the positive electrode current collector coated with the positive electrode mixture was rolled, thereby forming a positive electrode plate having a thickness of 150 μm. At this time, the positive electrode mixture coated portion had a width of 50 mm and a positive electrode mixture uncoated portion (exposed end) had a width of 6 mm.

(2) Formation of Negative Electrode Plate

First, 95 parts by weight of artificial graphite powder as a negative electrode active material and 5 parts by weight of PVDF as a binder were prepared. Then, the negative electrode active material and the binder were mixed, thereby forming a negative electrode mixture.

Next, the negative electrode mixture was applied to both surfaces of a negative electrode current collector made of copper foil and having a thickness of 10 μm and a width of 7 mm, and dried. Thereafter, a portion (negative electrode mixture coated portion) of the negative electrode current collector coated with the negative electrode mixture was rolled, thereby forming a negative electrode plate having a thickness of 160 μm. At this time, the negative electrode mixture coated portion had a width of 52 mm and a negative electrode mixture uncoated portion (exposed end) had a width of 5 mm.

(3) Formation of Electrode Group

A separator made of a polypropylene resin microporous film and having a width of 53 mm and a thickness of 25 μm was interposed between the positive electrode mixture coated portion and the negative electrode mixture coated portion. Thereafter, a positive electrode, a negative electrode and the separator were spirally wound, thereby forming an electrode group. In this case, the electrode group was formed so as to have an inside diameter of 6 mm and an outside diameter of 24 mm.

(4) Formation of Current Collector Plate

A 50 mm square aluminum plate having a thickness of 0.5 mm was press-molded into a disc shape having a diameter of 25 mm, and then a center of the disc was punched out by a press, thereby forming a positive electrode current collector plate having a through hole with a diameter of 5 mm. In the same manner, a negative electrode current collector plate made of nickel and having a thickness of 0.2 mm was also formed.

(5) Formation of Current Collector Configuration

With an end portion of the positive electrode plate abutting the positive electrode current collector plate, the end portion of the positive electrode plate was welded to the positive electrode current collector plate by laser-welding, and then, the electrode group was turned upside down. In the same manner, with an end portion of the negative electrode plate abutting the negative electrode current collector plate, the end portion of the negative electrode plate was welded to the negative electrode current collector plate by laser-welding.

In this case, laser-welding of the end portion to the positive electrode current collector plate was performed under the condition that a current value was 125 A and a welding time was 2.4 ms, and laser-welding of the end portion to the negative electrode current collector plate was performed under the condition that a current value was 100 A and a welding time was 2.6 ms. A welding spot diameter was 1 mm in both of the laser-welding to the positive electrode current collector plate and the laser-welding to the negative electrode current collector.

Locations on the current collector plate expressed by the following polar coordinates $(r, \theta)$ (coordinate axes were the same as those shown in FIG. 2(a)) were defined as welding spots (joint portions) to be welded by laser.

$$(r,\theta)=(3,2\pi/3), (3,4\pi/3), (3,2\pi), (4,\pi/2), (4,\pi), (4,3\pi/2), (4,2\pi), \ldots (n, 2m\pi/n)$$

(where n is a natural number satisfying $3 \leq n \leq 12$ and m is any natural number satisfying $m \leq n$)

(6) Formation of Cylindrical Lithium Ion Secondary Battery

The current collector configuration formed in the above-described manner was inserted in a cylindrical metal case having only an opening at one end. Thereafter, the negative electrode current collector plate was resistance welded to the metal case, and then, the positive electrode current collector plate and the sealing plate were laser welded via a positive electrode lead made of aluminum and with an insulation plate interposed between the positive electrode current collector plate and the sealing plate.

Ethylene carbonate and ethylmethyl carbonate were mixed in a volume ratio of 1:1 to prepare a nonaqueous solvent, and the nonaqueous solvent was dissolved in lithium hexafluorophosphate ($LiPF_6$) as a solute, thereby forming a nonaqueous electrolyte.

Thereafter, the metal case was heated and dried, and then, the nonaqueous electrolyte was injected into the metal case. Thereafter, the sealing plate was crimped by the metal case with a gasket interposed therebetween to seal the metal case, thereby forming a cylindrical lithium ion secondary battery having a diameter of 26 mm and a height of 65 mm. The obtained battery had a capacity of 2600 mAh.

Example 2

Except that locations on the current collector plate expressed by the following polar coordinates (r, θ) were defined as welding spots (joint portions) to be welded by laser, a battery of Example 2 was formed in the same manner as Example 1.

(r,θ)=(3,π), (3,2π), (4,2π/3), (4,4π/3), (4,2π), (5,π/2), (5,π), (5,3π/2), (5,2π), . . . (n,2(m−1)π/(n−1))

(where n is a natural number satisfying 3≦n≦12 and m is any natural number satisfying 2≦m≦n).

Example 3

(1) Formation of Positive Electrode Plate

The same positive electrode mixture as that of Example 1 was prepared, and the prepared positive electrode mixture was applied to both surfaces of a positive electrode current collector made of aluminum foil and having a thickness of 15 μm and a width of 83 mm. After the positive electrode mixture was dried, a positive electrode mixture coated portion was rolled, thereby forming a positive electrode plate having a thickness of 83 μm. At this time, the positive electrode mixture coated portion had a width of 77 mm and a positive electrode mixture uncoated portion had a width of 6 mm.

(2) Formation of Negative Electrode Plate

The same negative electrode mixture as that of Example 1 was prepared, and the prepared negative electrode mixture was applied to both surfaces of a negative electrode current collector made of copper foil and having a thickness of 10 μm and a width of 85 mm. After the negative electrode mixture was dried, a negative electrode mixture coated portion was rolled, thereby forming a negative electrode plate having a thickness of 100 μm. At this time, the negative electrode mixture coated portion had a width of 80 mm and a negative electrode mixture uncoated portion had a width of 5 mm.

(3) Formation of Electrode Body

A separator made of a polypropylene resin microporous film and having a width of 81 mm and a thickness of 25 μm was interposed between the positive electrode mixture coated portion and the negative electrode mixture coated portion. Thereafter, a positive electrode, a negative electrode and the separator were wound into a flat shape, thereby forming an electrode group. In this case, the electrode group was formed so that a long axis of the electrode group was 54 mm and a short axis thereof was 7 mm.

(4) Formation of Current Collector Plate

An aluminum plate having a thickness of 0.5 mm, a width of 8 mm, and a length of 55 mm was press-molded, thereby forming a positive electrode current collector plate. In the same manner, a negative electrode current collector plate made of a nickel plate and having a thickness of 0.2 mm was also formed.

(5) Formation of Current Collector Configuration

End portions of the positive electrode and the negative electrode were welded to the positive electrode current collector plate and the negative electrode current collector plate, respectively, under the same conditions as in Example 1.

Locations on the current collector plate expressed by the following coordinates (x, y) (coordinate axes were the same as those shown in FIG. 5) were defined as welding spots (joint portions).

(x,y)=(0,0), (0,±1), (0,±2), (0,±3), (±25,0), (±26,0), (±27,0)

(6) Formation of Flat Lithium Ion Secondary Battery

The current collector configuration formed in the above-described manner was inserted in a rectangular metal case having openings at both ends so that the positive electrode current collector plate and the negative electrode current collector plate protruding out from the openings.

Next, the negative electrode current collector plate was resistance welded to a flat plate which was to be a bottom plate of the metal case, and the negative electrode current collector plate was folded and placed in the metal case. Thereafter, the bottom plate was laser welded to the metal case to seal a bottom portion of the metal case.

In the same manner, the positive electrode current collector plate was laser welded to the sealing plate, and then the positive electrode current collector was folded and placed in the metal case. Thereafter, the sealing plate was laser welded to the metal case, so that the sealing plate was attached to an upper opening of the metal case. At this time, the sealing plate had an injection hole, and thus sealing was performed so as not to seal the injection hole.

Thereafter, the negative electrode current collector plate was resistance welded to the metal case, and then, the positive electrode current collector plate and the sealing plate were laser welded via a positive electrode lead made of aluminum and with an insulation plate interposed between the positive electrode plate and the sealing plate.

Subsequently, the metal case was heated and dried, and then, the same nonaqueous electrolyte as that of Example 1 was injected into the metal case and the injection hole was closely sealed. Thus, a flat lithium ion secondary battery having a thickness of 10 mm, a width of 58 mm, and a height of 100 mm was formed. The battery had a capacity of 2600 mAh.

Comparative Example 1

Except that locations on the current collector plate expressed by the following polar coordinates (r, θ) were defined as welding spots (joint portions) to be welded by laser, a battery of Comparative Example 1 was formed in the same manner as Example 1.

(r,θ)=(3,0), (3,π/2), (3,π), (3,3π/2), (4,0), (4,π/2), (4,π), (4,3π/2), . . . (n,mπ/2)

(where n is a natural number satisfying 3≦n≦12 and m is any natural number satisfying 1≦m≦4).

Note that the welding spots expressed by the above-described polar coordinates (r, θ) are substantially the same as those used for welding using a cross-shape current collector plate described in Patent Document 1.

Comparative Example 2

Except that locations on the current collector plate expressed by the following polar coordinates (x, y) were defined as welding spots (joint portions) to be welded by laser, a battery of Comparative Example 2 was formed in the same manner as Example 3.

(x,y)=(0,0), (0,±1), (0,±2), (0,±3), (±25,0), (±25,±1), (±25,±2), (±25,±3)

2. Evaluation Method of Lithium Ion Secondary Battery

Fifty lithium ion secondary batteries were prepared in the above-described manner for each of Examples 1 through 3 and Comparative Examples 1 and 2, and the following evaluation was conducted to the prepared batteries.

<Appearance Check of Joint Portions of Electrode Plate End Portion with Current Collector Plate>

An electrode group was taken out from a battery case of a produced lithium ion secondary battery, wound electrode plates were unwound, and joint portions were visually observed to obtain a joint pitch.

Table 1 shows values of joint pitch (distance between respective centers of adjacent joint portions) for joint portions at distances of 3 mm, 6 mm, 9 mm and 12 mm from a winding center of the electrode group in each of cylindrical lithium ion batteries (Examples 1 and 2, and Comparative Example 1).

TABLE 1

| Distance from winding center | Example 1 | Example 2 | Comparative Example 1 |
|---|---|---|---|
| 3 mm | 6.3 mm | 9.4 mm | 4.7 mm |
| 6 mm | 6.2 mm | 9.2 mm | 9.4 mm |
| 9 mm | 6.4 mm | 8.2 mm | 14.3 mm |
| 12 mm | 6.3 mm | 7.5 mm | 18.9 mm |
| Standard deviation | 0.256 | 1.234 | 4.261 |

As shown in Table 1, in Example 1, variations (standard deviations) of joint pitch were very small and joint pitches were substantially uniform. In Example 2, joint pitches differed by at most 2 mm, but still variations were small. In contrast, in Comparative Example 1, a difference between a joint pitch at an inner side and a joint pitch at an outer side was large, and variations were very large.

Table 2 shows maximum value and minimum value of joint pitch for flat lithium ion batteries (Example 3 and Comparative Example 2).

TABLE 2

| | Example 3 | Comparative Example 2 |
|---|---|---|
| Minimum joint pitch | 23.5 mm | 1.1 mm |
| Maximum joint pitch | 28.9 mm | 23.5 mm |
| Standard deviation | 1.613 | 8.360 |

As shown in Table 2, in Example 3, a joint pitch was minimum at an inner side and maximum at an outer side. This was probably caused by difference in length of an electrode plate between folded parts of an electrode group arranged along a long axis direction. Variations (standard deviations) of the joint pitch were small. In contrast, in Comparative Example 2, the joint pitch was minimum at folded part of the electrode group and maximum at flat surface part of the electrode group, and variations were very large.

<Cycle Test of Battery>

Cycle test was performed to Examples 1 through 3 and Comparative Example 1 and 2. Specifically, first, for each sample, a charge/discharge cycle in which a battery was charged with a constant current of 12.5 A until a battery voltage reached 4.2 V and then the battery was discharged with a constant current of 12.5 A until the battery voltage reached 3.0 V was repeated. A discharge capacity was measured for each cycle and a capacity maintenance rate (discharge capacity at an initial cycle was regarded as 100%) with respect to cycle number was obtained.

Figure 6:
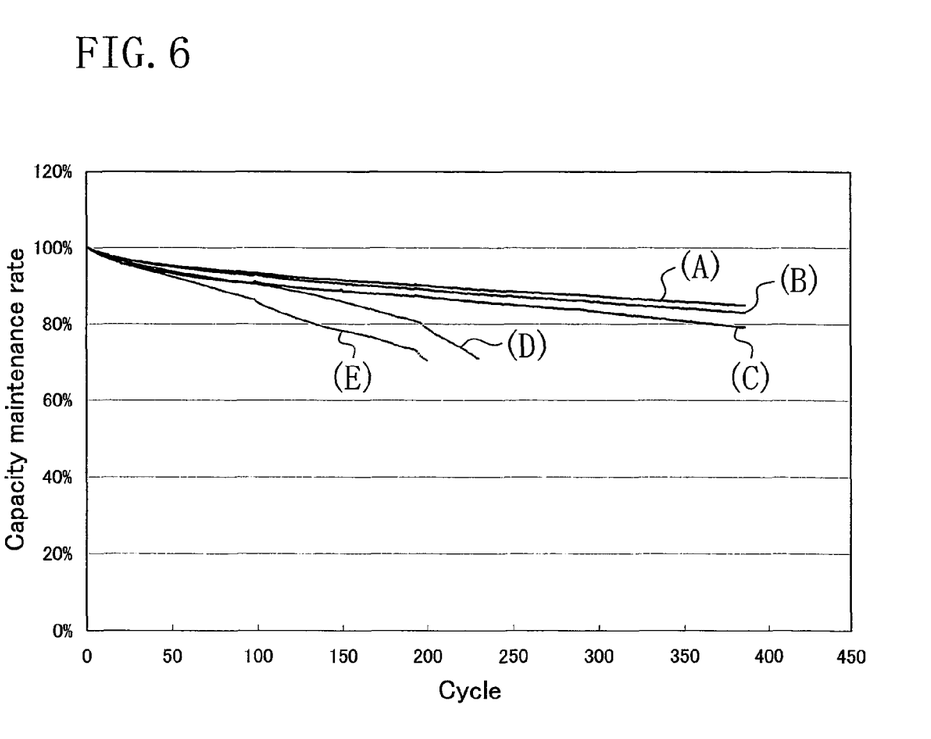
FIG. 6 is a graph showing cycle characteristics of secondary batteries of Examples and Comparative Examples.

FIG. 6 is a graph showing results of the cycle test, in which the abscissa indicates the cycle number and the ordinate indicates the capacity maintenance rate. As shown in FIG. 6, in each of the batteries of Examples 1 through 3 (indicated by curved lines A, B and C in FIG. 6), an excellent cycle characteristic was exhibited, but in the batteries of Comparative Examples 1 and 2 (indicated by curbed lines D and E in FIG. 6), the cycle characteristic was reduced. From this result, it is inferred that, when the joint pitch was uniform and a current distribution in an electrode plate was uniform, local deterioration of an electrolytic active material was not caused and, as a result, an excellent cycle characteristic was achieved. On the other hand, it is considered that, when variations of the joint pitch were large and variations of current distribution in an electrode plate were large, local deterioration of an electrolytic active material was caused and, as a result, deterioration of the cycle characteristic was accelerated.

The present invention has been described using the preferred embodiments. The description in the embodiments does not limit the present invention and, as a matter of course, various modifications are possible. For example, in the above-described embodiments, the electrode plate end portion is welded to the current collector plate by laser welding. However, welding is not limited to laser welding but may be performed by, for example, TIG (tungsten inert gas) welding, electron beam welding, and the like.

A secondary battery to which the present invention is applied is not limited to particular kinds. The present invention is applicable to nickel hydride storage batteries and the like as well as lithium ion secondary batteries. Moreover, even when the present invention is applied to an electrochemical device (such as a capacitor or the like) having the same current collector configuration as that of the present disclosure, the same effects can be achieved.

INDUSTRIAL APPLICABILITY

As described above, the present invention is useful for a secondary battery having a current collector configuration suitable for high output current application, and is applicable to, for example, driving power sources for electric tools, electric cars, and the like, which require high output, large capacity back-up power sources, electric storage power sources, and the like.

The invention claimed is:

1. A secondary battery comprising an electrode group in which a positive electrode plate and a negative electrode plate are wounded with a porous insulation layer interposed therebetween,
wherein an end portion of at least one of the electrode plates having one polarity protrudes from the porous insulation layer and abuts a current corrector plate and the current collector plate is arranged in relation to the electrode group so as to entirely cover the end portion of the electrode plate of the electrode group,
parts of the end portion of the electrode plate abutting the current collector plate are welded to the current collector plate with a uniform pitch along a winding direction of the electrode group at discrete joint portions on a surface of the current collector plate, the joint portions are discretely provided on the surface of the current collector plate so that a current flowing from the electrode plate to the current collector plate is uniformly distributed, and each of the joint portions is provided according to a location expressed by polar coordinates (r, θ), which is a point at a distance of r from a winding center of the electrode group regarded as an original point in a direction making an angle θ with a radial direction of the current collector plate regarded as an initial line, set on the surface of the current collector plate, wherein the polar coordinates (r, θ) is expressed by the following equation:

$$(r, \theta) = (ns, 2 m\pi/n),$$

where s is the width of the joint portions, n is 1 or a larger natural number, and m is a natural number satisfying $1 \leq m \leq n$.

2. The secondary battery of claim 1, wherein each of the joint portions has a width large enough to include the parts of the end portion of the electrode plate which abut the current collector plate and correspond to at least two or more windings.

* * * * *